(12) United States Patent
Stodart et al.

(10) Patent No.: US 11,872,737 B2
(45) Date of Patent: Jan. 16, 2024

(54) SYSTEM AND APPARATUS FOR INJECTION MOLDING

(71) Applicant: Promess, Inc., Brighton, MI (US)

(72) Inventors: Scot Stodart, Pinckney, MI (US); Andrew H. Joseph, Milford, MI (US); Glenn W. Nausley, Jr., Howell, MI (US)

(73) Assignee: Promess, Inc., Brighton, MI (US)

( * ) Notice: Subject to any disclaimer, the term of this patent is extended or adjusted under 35 U.S.C. 154(b) by 0 days.

(21) Appl. No.: 17/387,103

(22) Filed: Jul. 28, 2021

(65) Prior Publication Data

US 2022/0032521 A1 Feb. 3, 2022

Related U.S. Application Data

(60) Provisional application No. 63/058,702, filed on Jul. 30, 2020.

(51) Int. Cl.
*B29C 45/76* (2006.01)
*G05D 17/00* (2006.01)
*G05D 7/00* (2006.01)

(52) U.S. Cl.
CPC ............ *B29C 45/762* (2013.01); *B29C 45/76* (2013.01); *B29C 2945/7602* (2013.01); *B29C 2945/762* (2013.01); *B29C 2945/76013* (2013.01); *B29C 2945/76531* (2013.01); *B29C 2945/76658* (2013.01); *G05D 7/00* (2013.01); *G05D 17/00* (2013.01)

(58) Field of Classification Search
CPC ..................................................... B29C 45/76
See application file for complete search history.

(56) References Cited

U.S. PATENT DOCUMENTS

| | | | | |
|---|---|---|---|---|
| 3,642,402 A | * | 2/1972 | Hutchinson | B29C 45/76 425/543 |
| 3,773,451 A | * | 11/1973 | Bielfeldt | B29C 45/76 264/328.13 |
| 3,860,801 A | * | 1/1975 | Hunkar | B29C 45/76 425/149 |

(Continued)

FOREIGN PATENT DOCUMENTS

| | | |
|---|---|---|
| GB | 1002408 A | 8/1965 |
| JP | S6118162 A | 8/1986 |

(Continued)

*Primary Examiner* — Benjamin A Schiffman
(74) *Attorney, Agent, or Firm* — Quinn IP Law

(57) ABSTRACT

A system, method and apparatus for controlling an injection unit to transfer a material to a mold cavity includes a first actuator and a second actuator, and a controller that is operatively connected to the first actuator and the second actuator. The first and second actuators are coupled to a ram of the injection unit. The first actuator rotates the ram within the barrel, and the second actuator translates the ram within the barrel. During a material fill stage of an injection cycle, the controller controls the first actuator to rotate the ram within the barrel. The controller also controls the second actuator to translate the ram within the barrel, and controls the second actuator to retract the ram away from a nozzle of the injection unit while exerting a compression force on the ram towards the nozzle.

20 Claims, 3 Drawing Sheets

(56) References Cited

U.S. PATENT DOCUMENTS

| | | | | |
|---|---|---|---|---|
| 4,695,237 | A | * 9/1987 | Inaba | G05B 19/42 |
| | | | | 425/149 |
| 4,741,685 | A | * 5/1988 | Inaba | G05B 19/231 |
| | | | | 264/40.5 |
| 5,232,714 | A | * 8/1993 | Kohno | B29C 45/5008 |
| | | | | 366/78 |
| 5,346,657 | A | 9/1994 | Hara et al. | |
| 5,362,222 | A | * 11/1994 | Faig | B29C 45/80 |
| | | | | 425/149 |
| 6,365,075 | B1 | * 4/2002 | Kamiguchi | B29C 45/76 |
| | | | | 425/149 |
| 6,533,572 | B1 | * 3/2003 | Koide | B29C 45/661 |
| | | | | 425/589 |
| 7,021,917 | B2 | * 4/2006 | Uchiyama | B29C 45/76 |
| | | | | 425/149 |
| 7,914,716 | B2 | * 3/2011 | Shiozawa | B29C 45/76 |
| | | | | 425/149 |
| 9,162,386 | B2 | * 10/2015 | Komiya | B29C 45/762 |
| 9,815,233 | B2 | 11/2017 | Altonen et al. | |
| 10,076,861 | B2 | 9/2018 | Altonen et al. | |
| 10,365,083 | B2 | * 7/2019 | Takahashi | B25J 9/1633 |
| 2002/0056934 | A1 | * 5/2002 | Konno | B29C 45/76 |
| | | | | 264/328.1 |
| 2003/0110009 | A1 | * 6/2003 | Fujita | B29C 45/76 |
| | | | | 702/182 |
| 2017/0015029 | A1 | 1/2017 | Altonen et al. | |
| 2017/0021544 | A1 | 1/2017 | Pollard et al. | |
| 2017/0057133 | A1 | 3/2017 | Hanson, III et al. | |
| 2017/0182689 | A1 | 6/2017 | Berg, Jr. et al. | |

FOREIGN PATENT DOCUMENTS

| | | | | |
|---|---|---|---|---|
| JP | 2733198 | B2 | * 3/1998 | ............ B29C 45/021 |
| JP | 2761100 | B2 | * 6/1998 | ......... B29C 45/5008 |
| JP | 2000238106 | A | * 9/2000 | ............ B29C 45/76 |
| JP | 6032620 | B2 | 11/2016 | |
| JP | 6246615 | B2 | 12/2017 | |
| JP | 6287317 | B2 | 3/2018 | |

* cited by examiner

SYSTEM AND APPARATUS FOR INJECTION MOLDING

CROSS-REFERENCE TO RELATED APPLICATIONS

This application claims the benefit of U.S. Provisional Patent Application No. 63/058,702 filed on Jul. 30, 2020, the disclosure of which is hereby incorporated by reference.

INTRODUCTION

Injection molding includes equipment, control systems, and processes that inject pressurized liquified material into a mold to form a workpiece. Injection molding is suited for high-volume manufacturing of workpieces, often from a thermoplastic material. During injection molding, a material in the form of small beads or pellets is introduced into an injection molding machine, which melts the material employing heat and pressure. The molten material is injected into a mold cavity under pressure, and held under pressure until it has solidified. The solidified workpiece may then be removed, and the process repeated.

Quality of a molded workpiece may be evaluated based upon one or more metrics that are related to dimensional, aesthetic, and/or performance parameters. One process element that may affect quality of a molded workpiece is referred to as a "short shot", wherein there is an incomplete filling of a mold cavity with molten material during the injection step. A short shot may be caused by one or multiple factors that may temporarily or permanently affect flow of the molten material into the mold cavity. These factors may include insufficiently-sized restrictive-flow areas, such as gates, runners, and thin walls, low melt and/or mold-wall temperatures, a lack of vents to bleed the air trapped inside the cavity, an insufficient machine injection pressure (resulting from high melt resistance and a restricted flow path), volume, and/or ram speed, process management faults such as an empty hopper, a blocked feed throat, or a worn non-return (check) valve that causes loss of injection pressure or leakage of injection volume. These factors may also include a premature solidification of the molten material due to hesitation during injection, a poor filling pattern, or a prolonged injection time.

Changes in molding conditions may affect properties of the material. As an example, material specification differences between material batches and changes in environmental conditions, such as changes in ambient temperature or humidity, may increase or decrease viscosity of the material when it becomes molten. When viscosity of the molten material changes, quality of the molded workpiece may be affected. For example, if the viscosity of the molten material increases, the molded workpiece may be under-packed or less dense, due to a higher required pressure, after filling, to achieve a desired workpiece quality. Conversely, if the viscosity of the molten material decreases, the molded workpiece may experience flashing as thinner molten material is pressed into a seam of a mold cavity. Furthermore, recycled material that is mixed with virgin material may affect the melt flow index of the combined material. Inconsistent mixing of the two materials may also create melt flow index variation between cycles.

There is a need for injection molding systems and processes for fabricating molded workpieces that are robust to variations in the material and the molding process to produce repeatably consistent molded workpieces.

SUMMARY

The concepts described herein relate to systems, apparatuses, and methods that are related to injection molding. An injection molding cycle includes a material fill stage and an injection stage. During the material fill stage, material is loaded into an injection unit, during which it is transformed to a molten state employing heat energy and shear stress. During the injection stage, the molten material is injected into a mold die. The mold die is cooled, causing the molten material to solidify, thus forming a workpiece. The workpiece may then be removed.

In one embodiment, a system for controlling an injection unit that is arranged to transfer a material to a mold cavity is described. The system includes a first actuator and a second actuator, and a controller that is operatively connected to the first actuator and the second actuator. The first and second actuators are coupled to a ram of the injection unit that is disposed within a barrel of the injection unit. The first actuator is arranged to rotate the ram within the barrel, and the second actuator is arranged to translate the ram within the barrel. During a material fill stage of an injection cycle for operating the injection unit, the controller controls the first actuator to rotate the ram within the barrel. The controller also controls the second actuator to translate the ram within the barrel, and controls the second actuator to retract the ram away from a nozzle of the injection unit while exerting a compression force on the ram towards the nozzle.

By controlling the injection unit to exert a compression force on the ram towards the nozzle while retracting the ram away from the nozzle of the injection unit during the material fill stage of the injection cycle, material pressure within the barrel of the injection unit is maintained at a minimum or a constant desired compression force, thus maintaining a density of the material within the barrel as it transforms from a solid raw material to molten material. In this manner, operation of the injection unit is robust to variations in viscosity and other material properties, and robust to variation in temperature, resulting in production of repeatably consistent molded workpieces while dynamically adapting to changes in material properties such as viscosity, melt flow index, and other material properties that may occur. Furthermore, the system for controlling the injection unit is adaptable for use with materials having different material properties.

An aspect of the disclosure includes a torque transducer in communication with the controller, wherein the torque transducer is arranged to monitor a torque that is being exerted by the first actuator to rotate the ram.

Another aspect of the disclosure includes the torque transducer being disposed on the first actuator to monitor the torque that is being exerted by the first actuator to rotate the ram.

Another aspect of the disclosure includes the torque transducer being disposed on the ram to monitor the torque that is being exerted by the first actuator to rotate the ram.

Another aspect of the disclosure includes a load cell in communication with the controller, wherein the load cell is arranged to monitor the compression force that is being exerted on the ram by the second actuator.

Another aspect of the disclosure includes the load cell being disposed on the second actuator to monitor the compression force that is being exerted on the ram by the second actuator.

Another aspect of the disclosure includes the load cell being disposed on the ram to monitor the compression force that is being exerted on the ram by the second actuator.

Another aspect of the disclosure includes the compression force exerted by the second actuator on the ram towards the nozzle being at least a predetermined minimum compression force.

Another aspect of the disclosure includes the predetermined minimum compression force being determined based upon a material property of the material.

Another aspect of the disclosure includes the compression force exerted by the second actuator on the ram towards the nozzle of the injection unit being controlled to a desired compression force.

Another aspect of the disclosure includes the desired compression force being determined based upon a material property of the material.

Another aspect of the disclosure includes the first actuator including a ball-screw device and an electrically-controlled servomotor.

Another aspect of the disclosure includes the second actuator being an electrically-controlled motor.

Another aspect of the disclosure includes an apparatus for controlling an injection unit that is arranged to transfer a material to a mold cavity, wherein the injection unit includes a barrel, a ram, a material intake portion that is disposed on a first end of the barrel, and a nozzle that is disposed on a second end of the barrel, wherein the ram is rotatably and slidably disposed in a cavity defined by the barrel, and wherein the nozzle is in fluidic communication with the mold cavity. The apparatus includes an actuation unit including a first actuator, a second actuator, a load cell, and a controller. The first actuator is configured to rotate the ram within the barrel, and the second actuator is configured to exert a linear force on the ram to extend and retract the ram relative to the barrel. The load cell is arranged to monitor the linear force exerted on the ram by the second actuator. The controller is operatively connected to the first actuator and the second actuator and the controller is in communication with the torque transducer and the load cell. During a material fill stage, the controller controls the first actuator to rotate the ram within the barrel, and controls the second actuator to exert a compression force on the ram towards the nozzle and to retract the ram.

Another aspect of the disclosure includes the material being a thermoplastic material.

Another aspect of the disclosure includes the ram including a helically-shaped auger portion and a piston portion.

Another aspect of the disclosure includes the barrel including a heating element, wherein the controller is operatively connected to the heating element.

Another aspect of the disclosure includes a torque transducer, wherein the torque transducer is arranged to monitor a torque exerted by the first actuator to rotate the ram.

Another aspect of the disclosure includes a method for controlling an injection unit that is coupled to an injection mold. The method includes, during a material fill stage of an injection cycle for operating the injection unit, rotating a ram within a barrel of the injection unit, incorporating a material into the barrel, exerting a compressive force on the ram towards a nozzle of the injection unit, and retracting the ram away from the nozzle of the injection unit.

Another aspect of the disclosure includes heating the barrel coincident with incorporation of the raw material into the barrel.

The above summary is not intended to represent every possible embodiment or every aspect of the present disclosure. Rather, the foregoing summary is intended to exemplify some of the novel aspects and features disclosed herein. The above features and advantages, and other features and advantages of the present disclosure, will be readily apparent from the following detailed description of representative embodiments and modes for carrying out the present disclosure when taken in connection with the accompanying drawings and the claims.

BRIEF DESCRIPTION OF THE DRAWINGS

One or more embodiments will now be described, by way of example, with reference to the accompanying drawings, in which.

The appended drawings are not necessarily to scale and may present a somewhat simplified representation of various preferred features of the present disclosure as disclosed herein, including, for example, specific dimensions, orientations, locations, and shapes. Details associated with such features will be determined in part by the particular intended application and use environment.

DETAILED DESCRIPTION

Figure 1:
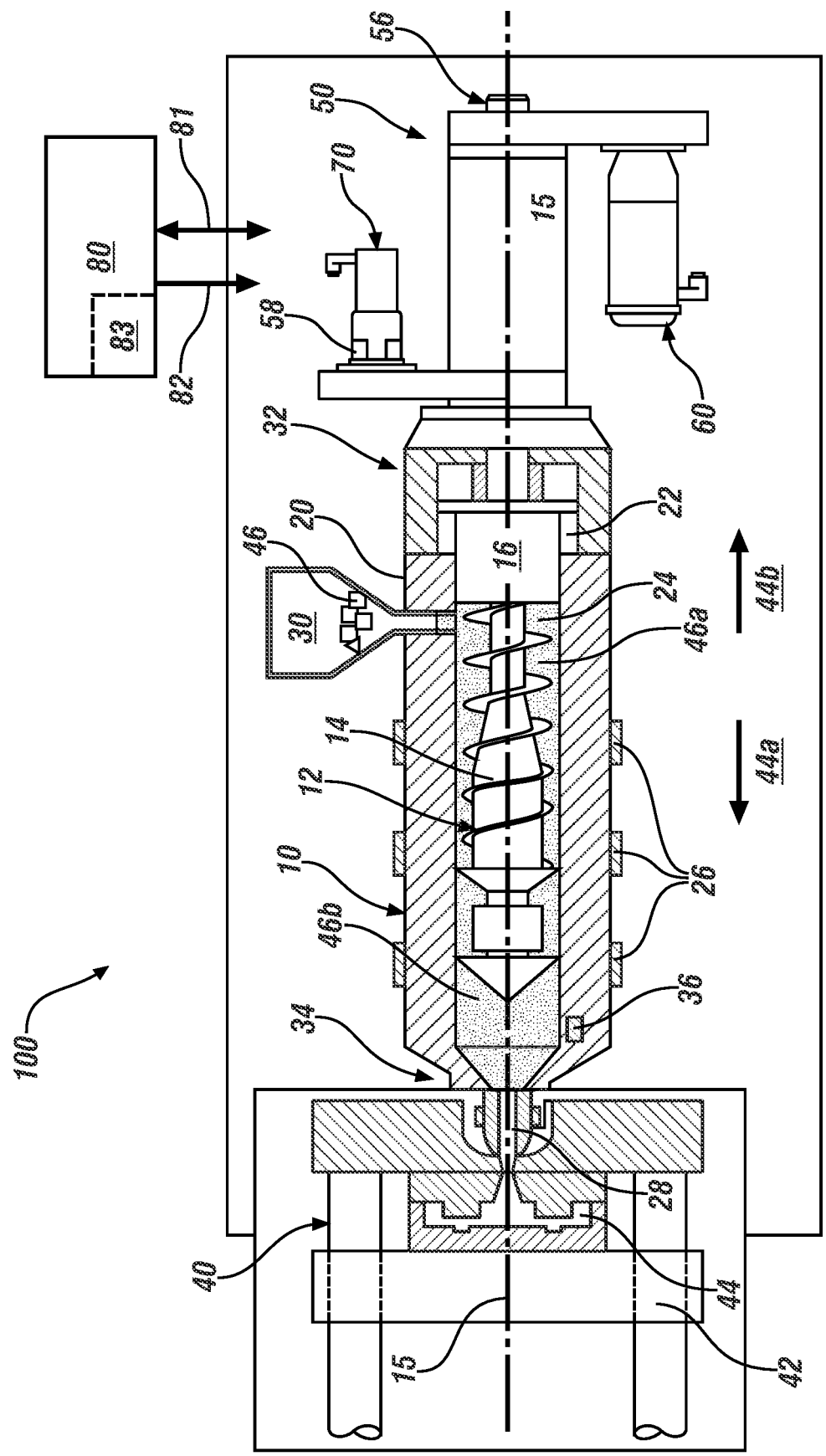
FIG. 1 schematically illustrates a partially cutaway side view of an embodiment of an injection molding system, in accordance with the disclosure.
Figure 2:
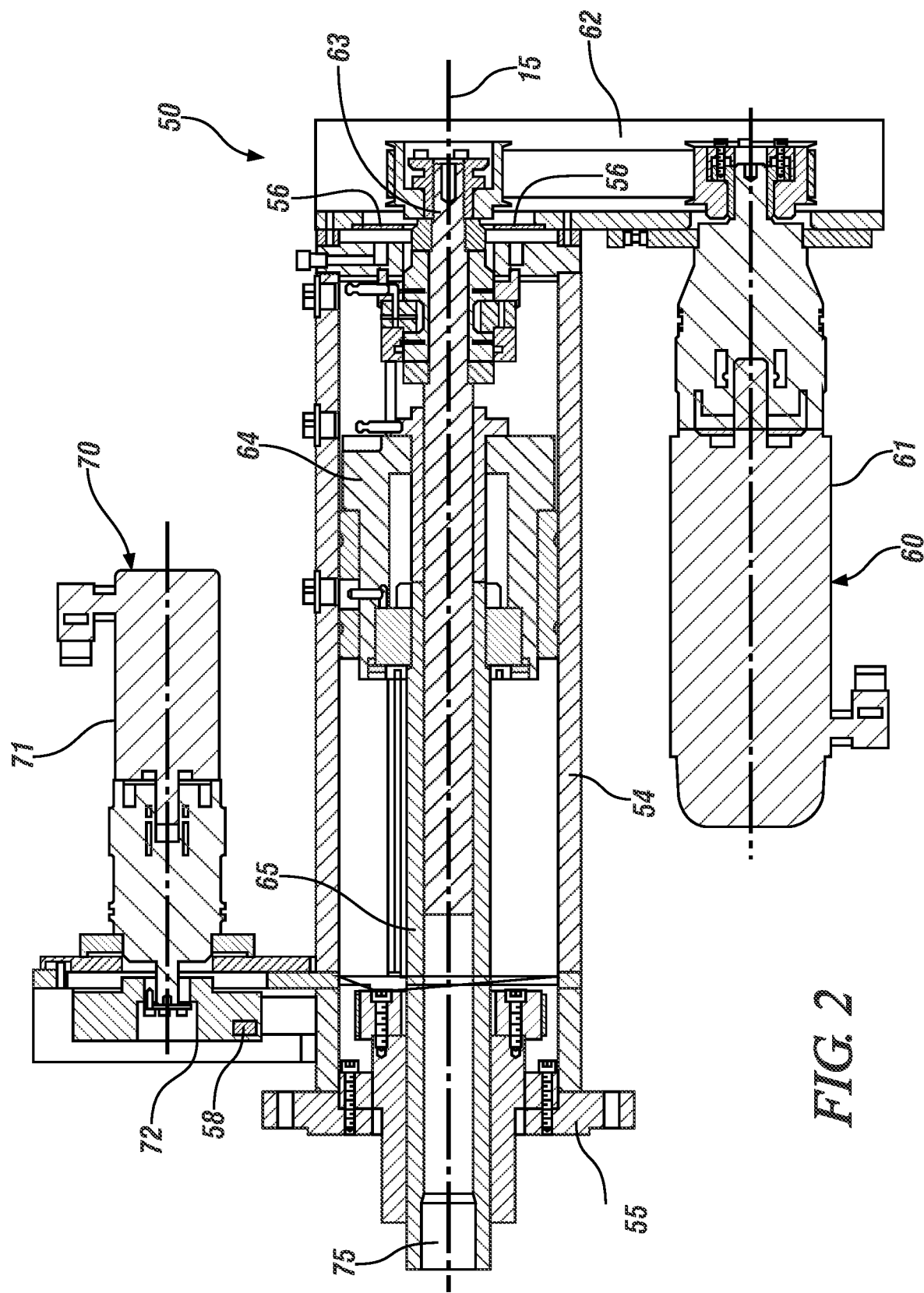
FIG. 2 schematically illustrates a cutaway side view of an embodiment of a drive unit for an injection molding system, in accordance with the disclosure.

Referring now to the drawings, which are provided for the purpose of illustrating certain exemplary embodiments only and not for the purpose of limiting the same, FIG. 1 illustrates an embodiment of an injection molding system 100 that includes an injection unit 10 and a drive unit 50 for preparing and injecting a material 46 into a mold die 40 to form a workpiece 44, and FIG. 2 illustrates an embodiment of the drive unit 50.

The injection unit 10 includes a cylindrically-shaped barrel 20 and a ram 12 that are arranged on a longitudinal axis 15. The barrel 20 forms and defines a first cylindrical cavity portion (first cavity) 22 and a second cylindrical cavity portion (second cavity) 24. The barrel 20 has a first end 32 and a second end 34, with a nozzle 28 disposed on the second end 34.

The ram 12 includes an auger 14 that is coupled to a piston 16, with both the auger 14 and the piston 16 arranged on and coaxial with the longitudinal axis 15. The auger 14 may be in the form of a helical screw. The ram 12 is disposed in the barrel 20, with the piston 16 of the ram 12 being disposed in the first cavity 22 and the auger 14 being disposed in the second cavity 24.

The ram 12 is configured to rotate within the barrel 20 about the longitudinal axis 15, and is configured to linearly translate within the barrel 20 along the longitudinal axis 15.

In one embodiment, and as shown, a material hopper 30 is arranged to supply the material 46 into the second cavity 24 of the barrel 20. The material 46 may be a thermoplastic resinous material, a powdered material, or another moldable material. The material 46 as fed into the injection unit 10 is a solid material, e.g., in the form of pellets or a powder, and is indicated by numeral 46a. The material 46 in its molten phase such as occurs within the injection unit 10 is indicated by numeral 46b.

The piston 16 of the ram 12 prevents flow of the material 46 towards the first end 32 and the first cavity 22. As such, no portion of the material 46 enters the first cavity 22. Stated differently, the material 46 is fed into the second cavity 24 on its first end 32 and flows out of the nozzle 28 on the second end 34. The nozzle 28 may include flow control valves and other elements (not shown) that control and manage flow of the material 46 to the mold die 40.

Rotation of the auger 14 urges flow of the material 46 towards the second end 34 and the nozzle 28 as additional amounts of the material 46 is fed from the material hopper 30 to the injection unit 10.

A plurality of heating elements 26 are arranged on the barrel 20 proximal to the second cavity 24. The heating elements 26 are devices that convert electrical, gas, or other potential energy sources to heat, with the heat being transferred through the barrel 20 to the second cavity 24 to heat the material 46. The heating elements 26 are controlled by the controller 80, either directly or via a second control device (not shown). A temperature sensor 36 may be disposed in the barrel 20 proximal to the second cavity 24, and arranged to monitor temperature of the material 46.

The rotation of the auger 14 and operation of the heating elements 26 to heat the barrel 20 combine to effect transition of the material 46 from the solid phase, indicated by numeral 46a, to the molten phase, indicated by numeral 46b, as flow of the material 46 is urged towards the second end 34 and the nozzle 28.

Referring now to FIG. 2, with continued reference to FIG. 1, the drive unit 50 is arranged on and connected to the injection unit 10 on the first end 32, and the mold die 40 is arranged on and connected to the nozzle 28 of the injection unit 10 on the second end 34.

The drive unit 50 includes a first rotatable shaft 63, a second rotatable shaft 65, and a ball/screw arrangement 64 that are coaxially arranged in a housing 54. The housing 54 is mechanically coupled to the injection unit 10 via a flange mount 55. A first, rotary actuator 60 is coupled to one end of the first rotatable shaft 63, and a second, linear actuator 70 is coupled to the second rotatable shaft 65. A portion 75 of the second rotatable shaft 65 extends outside the housing 54 and couples with the ram 12 of the injection unit 10.

The rotary actuator 60 includes a first motor 61 that couples to the first rotatable shaft 63 via a first drive mechanism 62. The linear actuator 70 includes a second motor 71 that couples to the second rotatable shaft 65 via a second drive mechanism 72. The first and second drive mechanisms 62, 72 may each be configured as a belt drive, a chain drive, a gear drive, a direct drive, or another mechanical drive mechanism to enable the first motor 61 to controllably rotate the first rotatable shaft 63 and to enable the second motor 71 to controllably rotate the second rotatable shaft 65.

The rotary actuator 60 is controllable to rotate the first rotatable shaft 63, which interacts with the ball/screw arrangement 64 to cause the second rotatable shaft 65 to extend its linear position relative to the housing 54 when the first rotatable shaft 63 is rotated in a first direction. The rotary actuator 60 is controllable to rotate the first rotatable shaft 63 in a second, opposite direction to cause the second rotatable shaft 65 to retract its linear position relative to the housing 54.

The second rotatable shaft 65 is arranged in the housing 54 such that it is rotatable about the longitudinal axis 15.

The first and second motors 61, 71 are configured as electric-powered stepper motors, servo motors, or another electrically powered device in one embodiment. Alternatively, the motors may be arranged hydraulic-powered rotational motors, pneumatic-powered rotational motors, or other devices. Operations of the first and second motors 61, 71 are controlled by the controller 80.

The drive unit 50 also includes, in one embodiment, a load cell 56 and a torque sensor 58. The load cell 56 is arranged to monitor compression force that is being exerted on the ram 12 by operation of the drive unit 50, including operation of either or both of the rotary actuator 60 and the linear actuator 70. The load cell 56 is a force transducer, such as a strain gage, that converts tension and compression forces into a calibratable electrical signal that can be correlated to linear force. In one embodiment, the load cell 56 may be disposed on the linear actuator 70 to monitor the compression force that is being exerted on the ram 12 by the linear actuator 70. Alternatively, the load cell 56 may be disposed on the ram 12 of the injection unit 10 to monitor the compression force that is being exerted on the ram 12 by the linear actuator 70.

The torque sensor 58 is arranged to monitor torque that is being exerted on the ram 12 by operation of the rotary actuator 60. In one embodiment, the torque sensor 58 is a strain gage torque sensor that converts torque forces into a calibratable electrical signal. Alternatively, the torque sensor 58 may be an electrical power monitoring device or system that converts an electric power signal, e.g., current, into a calibratable electrical signal that can be correlated to torque. Alternatively, the torque sensor 58 may be arranged on an element of the injection unit 10 to monitor torque.

The controller 80 is operatively connected to the rotary actuator 60 and the linear actuator 70 via control lines 82, and is in communication with the load cell 56 and the torque sensor 58 via communication links 81. The controller 80 includes one or multiple control routines 83 that control the first, rotary actuator 60 to rotate the ram 12 within the barrel 20, and control the second, linear actuator 70 to exert a linear force on the ram 12 to extend and retract the ram 12 relative to the barrel 20 during repetitively executed injection molding cycles. Each of the repetitively executed injection molding cycles includes injection stages of a material fill stage, an advance shot stage, a pack stage, and a hold stage. During each injection molding cycle, the controller 80 controls the first, rotary actuator 60 to rotate the ram 12 within the barrel 20, controls the second, linear actuator 70 to exert a linear force on the ram 12 to extend and retract the ram 12 relative to the barrel 20, monitors signal inputs from the load cell 56 that is arranged to monitor the linear force exerted on the ram 12 by the linear actuator 70, and monitors signal inputs from the torque sensor 58 that is arranged to monitor the rotation of the ram 12 within the barrel during each of the aforementioned stages. The control routines 83 are programmable, such that the first, rotary actuator 60 may be programmed to control rotation of the ram 12 within the barrel 20 at a selectable constant rotational speed or at a variable rotational speed according to preset conditions and/or in response to dynamic conditions based upon feedback from the torque sensor 58. The control routines 83 are further programmable, such that the second, linear actuator 70 may be programmed to extend and retract the ram 12 relative to the barrel 20. This includes the control routines 83 that are programmable to control the second, linear actuator 70 to retract the ram 12 relative to the barrel 20 while exerting a linear force on the ram 12 in the direction of the nozzle 28, wherein the linear force being exerted on the ram 12 is a constant linear force that is selectable according to preset conditions related to properties of the material 46, and/or in response to dynamic conditions based upon feedback from the load cell 56, the torque sensor 58, the temperature sensor 36, or another parameter.

Figure 3:
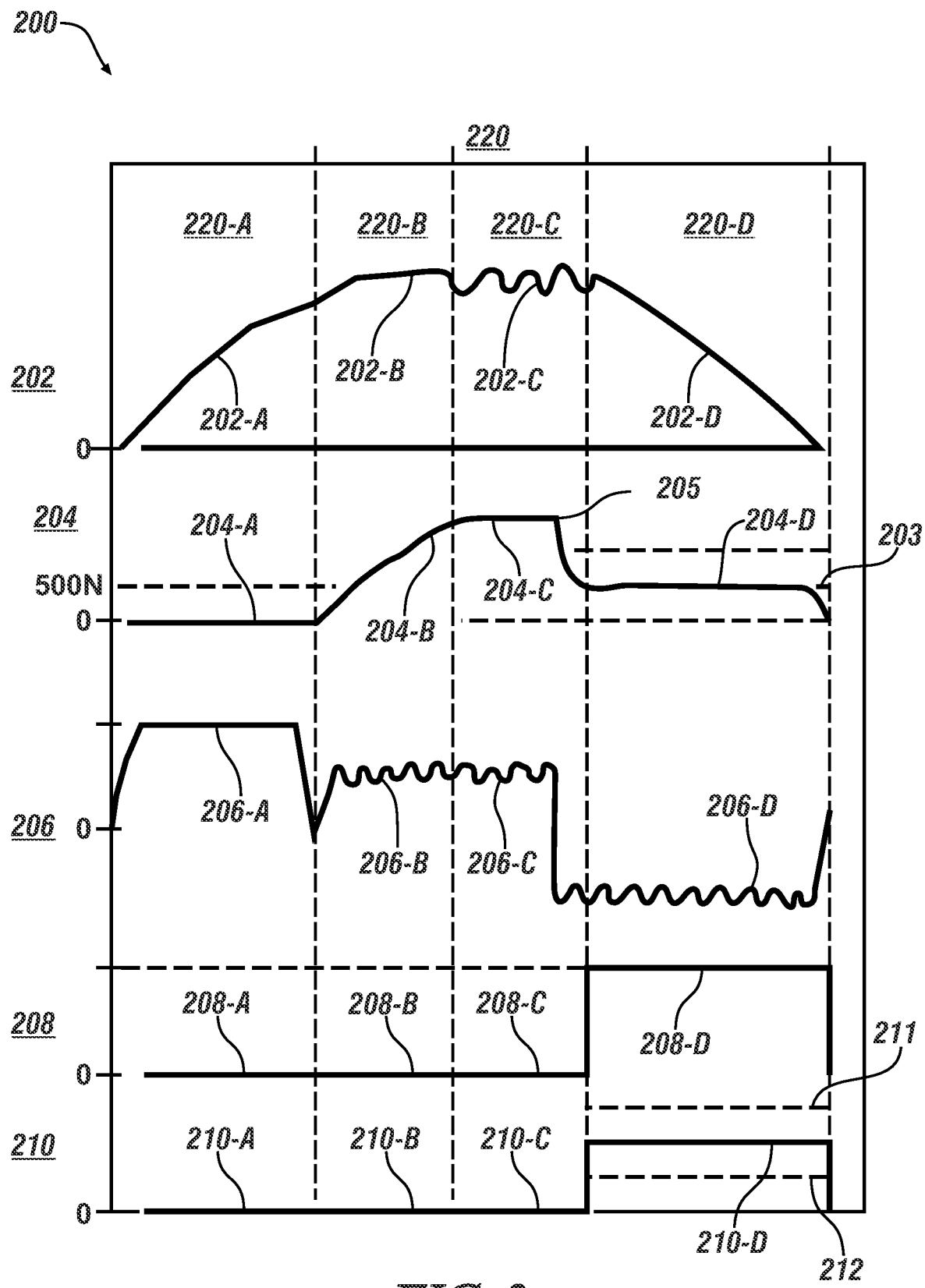
FIG. 3 graphically illustrates a plurality of process states that are associated with operation of an embodiment of the injection unit that is described with reference to FIG. 1 during a single injection molding cycle, in accordance with the disclosure.

FIG. 3 graphically shows a plurality of process states that are associated with operation of an embodiment of the injection unit 10 that is described with reference to FIGS. 1 and 2 during a single injection molding cycle 200. The injection molding cycle 200 includes injection stages that include an advance shot stage 220-A, a pack stage 220-B, and a hold stage 220-C. The injection molding cycle 200 also includes a material fill stage 220-D.

The plurality of process states includes a linear position 202, which indicates a linear position of the linear actuator 70 of the drive unit 50, which is coupled to and correlates to a linear position of the ram 12 of the injection unit 10 in relation to the barrel 20.

The plurality of process states includes a linear force 204, which indicates a linear force being exerted by the linear actuator 70, which is coupled to and correlates to a linear force being exerted by the ram 12 of the injection unit 10 in relation to the barrel 20. The linear force 204 may be in the form of a compression force that is being exerted by the ram 12 of the injection unit 10 towards the barrel 20 and nozzle 28, or a tension force.

The plurality of process states includes a linear velocity 206, which indicates a time-rate change in the linear position of the linear actuator 70, which is coupled to and correlates to a time-rate change in the linear position of the ram 12 of the injection unit 10 in relation to the barrel 20.

The plurality of process states includes a rotational velocity 208, which indicates a rotational speed of the rotary actuator 60 of the drive unit 50, which is coupled to and correlates to a rotational speed of the auger 14 of the ram 12 in relation to the barrel 20.

The plurality of process states includes a rotational torque 210, which indicates a rotational torque of the rotary actuator 60 of the drive unit 50, which is coupled to and correlates to a rotational torque of the auger 14 of the ram 12.

During the advance shot stage 220-A, the pack stage 220-B, and the hold stage 220-C of the injection molding cycle 200, controller 80 controls the linear actuator 70 of the drive unit 50 to control the linear position 202, the linear force 204, and the linear velocity 206 of the linear actuator 70, and thus controls the ram 12 of the injection unit 10 in relation to the barrel 20. During the advance shot stage 220-A, the pack stage 220-B, and the hold stage 220-C of the injection molding cycle 200, the rotary actuator 60 of the drive unit 50 is deactivated, i.e., the ram 12 does not rotate, which means that the rotational velocity 208 and the rotational torque 210 are zero, as indicated at 208A, 208B, 208C, and 210A, 210B, and 210C.

During the advance shot stage 220-A, the linear actuator 70 is time-controlled to advance the linear position 202A of the ram 12 towards the nozzle 28 at a preset, substantially constant linear velocity 206A, and at a zero or a low, minimal linear force 204A. The linear actuator 70 is controlled to advance the linear position 202A of the ram 12 until it has reached a predetermined linear position relative to the nozzle 28, or based upon another criteria.

During the pack stage 220-B and the hold stage 220-C, the linear actuator 70 is force-controlled to advance the linear position 202A of the ram 12 towards the nozzle 28. Injection of the molten material 46b into the mold die 40 occurs during the pack stage 220-B.

During the pack stage 220-B, the linear velocity 206B of the linear actuator 70 is controlled at a constant speed, increasing the linear force 204B as the linear position 202B of the ram 12 achieves a controlled maximum position.

During the hold stage 220-C, the linear actuator 70 is controlled to achieve a linear force 204C that is equivalent to a predetermined linear force 205 by maintaining the linear position 202C and maintaining the linear velocity 206C of the linear actuator 70 at controlled states.

At the end of the hold stage 220-C, the linear force 204C is reduced to a lesser, albeit positive compression force 204D.

Said another way, during the advance shot stage 220-A, the pack stage 220-B, and the hold stage 220-C, the controller 80 controls the injection unit 10 to inject the molten material 46b into the mold die 40 to form a workpiece 44 by translating the auger 14 in the second cavity 24 of the barrel 20 towards the nozzle 28, thus forcing the molten material 46b to move towards nozzle 28 under pressure. The mold die 40 is then actively or passively cooled, causing the workpiece 44 to solidify. The solidified workpiece 44 may then be removed.

The material fill stage 220-D begins when the hold stage 220-C is completed.

During the material fill stage 220-D, the controller 80 controls the first, rotary actuator 60 to rotate the ram 12 within the barrel 20 of the injection unit 10 at a constant rotational velocity 209, while introducing a portion of the solid material 46a from the material hopper 30 into the second cavity 24. Rotation of the ram 12 by the rotary actuator 60 rotates the auger 14. Simultaneously, the controller 80 activates the heating elements 26. The rotation of the auger 14 of the ram 12 coupled with activation of the heating elements 26 acts to transform the solid material 46a to molten form, which generates a linear force on the ram 12 towards the drive unit 50 as the molten material 46b fills the second cavity 24 of the barrel 20. The controller 80 controls the linear actuator 70 to control a linear position 202D of the ram 12, and thus control translation of the ram 12 within the barrel 20 by exerting a compression force 204D on the ram 12 towards the nozzle 28 and the mold die 40, as indicated by arrow 44a, as shown with reference to FIG. 1. This includes the controller 80 controlling the linear actuator 70 to controllably retract the ram 12 away from the nozzle 28 and the mold die 40 at a controlled linear velocity 206D, as indicated by arrow 44b, as shown with reference to FIG. 1. This also includes simultaneous control of the linear actuator 70 to exert the compression force 204D on the ram 12 towards the nozzle 28 and the mold die 40 during the rotation of the auger 14 when the solid material 46a is being introduced into the second cavity 24 of the barrel 20. Preferably, the magnitude of the compression force 204D is a calibratable value that is determined based upon properties related to the material 46, including its melting point, viscosity, etc. In one embodiment, the controller 80 controls the linear actuator 70 to hold the compression force 204D to at least a minimum compression force while the linear actuator 70 controllably retracts the ram 12 at a constant linear velocity. In one embodiment, the controller 80 controls the linear actuator 70 to maintain the compression force 204D at a constant desired compression force 203 while the linear actuator 70 controllably retracts the ram 12 at a controlled linear velocity. In one embodiment, the minimum or the constant desired compression force 203 is 500 N. The minimum compression force and the constant desired compression force 203 are calibratable values that may be selected based upon one or more properties of the material 46.

Said another way, during the material fill stage 220-D, the solid material 46*a* is loaded from the hopper 30 into the injection unit 10, during which the solid raw material 46*a* changes phase to the molten material 46*b* employing heat energy and shear stress, which is induced by actuating the heating elements 26 and rotating the auger 14 by operation of the rotary actuator 60. The controller 80 controls the linear actuator 70 to retract the ram 12 away from the nozzle 28 and the mold cavity 40 and to simultaneously exert a compression force on the ram 12 towards the mold cavity 40. Introduction of the solid material 46*a* into the barrel 20 of the injection unit 10 while rotating the auger 14 to move the molten material 46*b* towards the nozzle 28 induces a load in the second cavity 24, which is counteracted and held to the compression force 204D by the linear actuator 70 during the material fill stage 220-D.

Furthermore, during the material fill stage 220-D, the controller 80 monitors torque being exerted by the rotary actuator 60 by monitoring output from the torque sensor 58. The rotational torque is indicated by 210, along with upper and lower torque limits 211 and 212, respectively. The upper and lower torque limits 211 and 212, respectively, may be time-invariant during the material fill stage 220-D in one embodiment. Alternatively, one or both of the upper and lower torque limits 211 and 212, respectively may vary during the material fill stage 220-D to accommodate expected changes in properties of the material 46 as it is subjected to heat and shear forces.

When the rotational torque is less than the lower torque limit 212, it may indicate inadequate feed of the material 42, indicating that the material hopper 30 is low, empty, or plugged. When the rotational torque is either less than the lower torque limit 212 or greater than the upper torque limit 211, it may indicate an incorrect material is being employed, or that there is a fault with the material 42. When the rotational torque is greater than the upper torque limit 211, it may indicate a fault with the heating elements 26. Furthermore, when the rotational torque is either less than the lower torque limit 212 or greater than the upper torque limit 211, it may indicate an unexpected change in viscosity of the material 42, which may require further evaluation.

The term "controller" and related terms such as microcontroller, control module, module, control, control unit, processor and similar terms refer to one or various combinations of Application Specific Integrated Circuit(s) (ASIC), Field-Programmable Gate Array (FPGA), electronic circuit(s), central processing unit(s), e.g., microprocessor(s) and associated non-transitory memory component(s) in the form of memory and storage devices (read only, programmable read only, random access, hard drive, etc.). The non-transitory memory component is capable of storing machine readable instructions in the form of one or more software or firmware programs or routines, combinational logic circuit(s), input/output circuit(s) and devices, signal conditioning, buffer circuitry and other components, which can accessed by and executed by one or more processors to provide a described functionality. Input/output circuit(s) and devices include analog/digital converters and related devices that monitor inputs from sensors, with such inputs monitored at a preset sampling frequency or in response to a triggering event. Software, firmware, programs, instructions, control routines, code, algorithms and similar terms mean controller-executable instruction sets including calibrations and look-up tables. Each controller executes control routine(s) to provide desired functions. Routines may be executed at regular intervals, for example each 100 microseconds during ongoing operation. Alternatively, routines may be executed in response to occurrence of a triggering event. Communication between controllers, actuators and/or sensors may be accomplished using a direct wired point-to-point link, a networked communication bus link, a wireless link or another suitable communication link. Communication includes exchanging data signals in suitable form, including, for example, electrical signals via a conductive medium, electromagnetic signals via air, optical signals via optical waveguides, and the like. The data signals may include discrete, analog or digitized analog signals representing inputs from sensors, actuator commands, and communication between controllers.

As used herein, the term "system" may refer to one of or a combination of mechanical and electrical hardware, sensors, controllers, application-specific integrated circuits (ASIC), combinatorial logic circuits, software, firmware, and/or other components that are arranged to provide the described functionality.

The term "signal" refers to a physically discernible indicator that conveys information, and may be a suitable waveform (e.g., electrical, optical, magnetic, mechanical or electromagnetic), such as DC, AC, sinusoidal-wave, triangular-wave, square-wave, vibration, and the like, that is capable of traveling through a medium.

The terms "calibration", "calibrated", and related terms refer to a result or a process that correlates a desired parameter and one or multiple perceived or observed parameters for a device or a system. A calibration as described herein may be reduced to a storable parametric table, a plurality of executable equations or another suitable form that may be employed as part of a measurement or control routine.

A parameter is defined as a measurable quantity that represents a physical property of a device or other element that is discernible using one or more sensors and/or a physical model. A parameter can have a discrete value, e.g., either "1" or "0", or can be infinitely variable in value.

The components of the disclosed embodiments, as described and illustrated herein, may be arranged and designed in a variety of different configurations. Thus, the following detailed description is not intended to limit the scope of the disclosure, as claimed, but is merely representative of possible embodiments thereof. In addition, while numerous specific details are set forth in the following description in order to provide a thorough understanding of the embodiments disclosed herein, some embodiments can be practiced without some of these details. Moreover, for the purpose of clarity, certain technical material that is understood in the related art has not been described in detail in order to avoid unnecessarily obscuring the disclosure.

For purposes of convenience and clarity only, directional terms such as top, bottom, left, right, up, over, above, below, beneath, rear, and front, may be used with respect to the drawings. These and similar directional terms are not to be construed to limit the scope of the disclosure. Furthermore, the disclosure, as illustrated and described herein, may be practiced in the absence of an element that is not specifically disclosed herein.

The following Clauses provide example configurations of a system and method for controlling an injection unit, as disclosed herein.

Clause 1. A system for controlling an injection unit that is arranged to transfer a material to a mold cavity, the system comprising: a first actuator, a second actuator, and a controller; wherein the controller is operatively connected to the first actuator and the second actuator; wherein the first and second actuators are coupled to a ram of the injection unit that is disposed within a barrel of the injection unit; wherein, during a material fill stage of an injection cycle for operating the injection unit during which the material is introduced into the injection unit: the controller controls the first actuator to rotate the ram within the barrel, the controller controls the second actuator to translate the ram within the barrel, and the controller controls the second actuator to retract the ram away from a nozzle of the injection unit that fluidly couples to the mold cavity and to exert a compression force on the ram towards the nozzle of the injection unit.

Clause 2. The system of clause 1, further comprising a torque transducer in communication with the controller, wherein the torque transducer is arranged to monitor a torque that is being exerted by the first actuator to rotate the ram.

Clause 3. The system of clauses 1-2, wherein the torque transducer is disposed on the first actuator to monitor the torque that is being exerted by the first actuator to rotate the ram.

Clause 4. The system of clauses 1-3, wherein the torque transducer is disposed on the ram to monitor the torque that is being exerted by the first actuator to rotate the ram.

Clause 5. The system of clauses 1-4, further comprising a load cell in communication with the controller, wherein the load cell is arranged to monitor the compression force that is being exerted on the ram by the second actuator.

Clause 6. The system of clauses 1-5, wherein the load cell is disposed on the second actuator to monitor the compression force that is being exerted on the ram by the second actuator.

Clause 7. The system of clauses 1-6, wherein the load cell is disposed on the ram to monitor the compression force that is being exerted on the ram by the second actuator.

Clause 8. The system of clauses 1-7, wherein the compression force exerted by the second actuator on the ram towards the nozzle of the injection unit is at least a predetermined minimum compression force.

Clause 9. The system of clauses 1-8, wherein the predetermined minimum compression force is determined based upon a material property of the material.

Clause 10. The system of clauses 1-9, wherein the controller controls the second actuator to exert the compression force on the ram towards the nozzle of the injection unit, wherein the compression force exerted by the second actuator on the ram towards the nozzle of the injection unit is controlled to a constant desired compression force.

Clause 11. The system of clauses 1-10, wherein the constant desired compression force is determined based upon a material property of the material.

Clause 12. The system of clauses 1-11, wherein the controller controls the second actuator to retract the ram away from the nozzle and to simultaneously exert a compression force on the ram in the direction of the nozzle.

Clause 13. The system of clauses 1-12, wherein the second actuator comprises a ball-screw device and an electrically-controlled motor.

Clause 14. The system of clauses 1-13, wherein the first actuator comprises an electrically-controlled motor.

Clause 15. An apparatus for controlling an injection unit that is arranged to transfer a material to a mold cavity, wherein the injection unit includes a barrel, a ram, a material intake portion that is disposed on a first end of the barrel, and a nozzle that is disposed on a second end of the barrel, wherein the ram is rotatably and slidably disposed in a cavity defined by the barrel, and wherein the nozzle is in fluidic communication with the mold cavity, the apparatus comprising: an actuation unit including a first actuator, a second actuator, a torque transducer, and a load cell; and a controller; wherein the first actuator is configured to rotate the ram within the barrel; wherein the second actuator is configured to exert a linear force on the ram to extend and retract the ram relative to the barrel; wherein the load cell is arranged to monitor the linear force exerted on the ram by the second actuator; wherein the controller is operatively connected to the first actuator and the second actuator; wherein the controller is in communication with the torque transducer and the load cell; and wherein, during a material fill stage, the controller is operative to: control the first actuator to rotate the ram within the barrel, and control the second actuator to exert a compression force on the ram towards the nozzle and to retract the ram.

Clause 16. The apparatus of clause 15, wherein the material comprises a thermoplastic material.

Clause 17. The apparatus of clauses 15-16, wherein the barrel includes a heating element, and wherein the controller is operatively connected to the heating element.

Clause 18. The apparatus of clauses 15-17, further comprising a torque transducer, wherein the torque transducer is arranged to monitor a torque exerted by the first actuator to rotate the ram.

Clause 19. A method for controlling an injection unit that is coupled to an injection mold, the method comprising: during a material fill stage of an injection cycle for operating the injection unit: rotating a ram within a barrel of the injection unit, incorporating a material into the barrel, exerting a compressive force on the ram towards a nozzle of the injection unit; and retracting the ram away from the nozzle of the injection unit.

Clause 20. The method of clause 19, further comprising heating the barrel coincident with the incorporating the material into the barrel.

The detailed description and the drawings or figures are supportive and descriptive of the present teachings, but the scope of the present teachings is defined solely by the claims. While some of the best modes and other embodiments for carrying out the present teachings have been described in detail, various alternative designs and embodiments exist for practicing the present teachings defined in the claims.

What is claimed is:

1. A system for controlling an injection unit that is arranged to transfer a material to a mold cavity, the system comprising:
   a first actuator, a second actuator, a torque transducer, and a controller;
   wherein the controller is operatively connected to the first actuator and the second actuator, and in communication with the torque transducer;
   wherein the first and second actuators are coupled to a ram of the injection unit that is disposed within a barrel of the injection unit;
   including the first actuator being a rotary actuator, and the second actuator being a linear actuator;
   wherein the torque transducer is arranged to monitor a torque that is being exerted by the first actuator to rotate the ram; and
   wherein the controller includes an instruction set, the instruction set being executable to:
   execute an injection molding cycle that includes an advance shot stage, a pack stage, a hold stage, and a material fill stage;

deactivate, during the advance shot stage, the pack stage, and the hold stage, the first actuator such that the ram is not rotated within the barrel;
control the first and second actuators to inject the material into the mold cavity during execution of the pack stage; and
during the material fill stage:
control the first actuator to rotate the ram within the barrel to maintain a constant torque based upon feedback from the torque transducer,
control the second actuator to translate the ram within the barrel, and
control the second actuator to retract the ram away from a nozzle of the injection unit that fluidly couples to the mold cavity and to exert a compression force on the ram towards the nozzle of the injection unit.

2. The system of claim 1, wherein the torque transducer is disposed on the first actuator to monitor the torque that is being exerted by the first actuator to rotate the ram.

3. The system of claim 1, wherein the torque transducer is disposed on the ram to monitor the torque that is being exerted by the first actuator to rotate the ram.

4. The system of claim 1, further comprising a load cell in communication with the controller, wherein the load cell is arranged to monitor the compression force that is being exerted on the ram by the second actuator.

5. The system of claim 4, wherein the load cell is disposed on the second actuator to monitor the compression force that is being exerted on the ram by the second actuator.

6. The system of claim 4, wherein the load cell is disposed on the ram to monitor the compression force that is being exerted on the ram by the second actuator.

7. The system of claim 1, wherein the compression force exerted by the second actuator on the ram towards the nozzle of the injection unit is at least a predetermined minimum compression force.

8. The system of claim 7, wherein the predetermined minimum compression force is determined based upon a material property of the material.

9. The system of claim 1, wherein the instruction set is executable to control the second actuator to exert the compression force on the ram towards the nozzle of the injection unit, wherein the compression force exerted by the second actuator on the ram towards the nozzle of the injection unit is controlled to a constant desired compression force.

10. The system of claim 9, wherein the constant desired compression force is determined based upon a material property of the material.

11. The system of claim 1, wherein the instruction set being executable to control the second actuator to retract the ram away from the mold cavity and to exert the compression force on the ram towards the nozzle of the injection unit comprises the instruction set being executable to control the second actuator to retract the ram away from the nozzle and to simultaneously exert the compression force on the ram towards the nozzle.

12. The system of claim 1, wherein the second actuator comprises a ball-screw device and an electrically-controlled motor.

13. The system of claim 1, wherein the first actuator comprises an electrically-controlled motor.

14. The system of claim 1, wherein the controller controls the first actuator to rotate the ram within the barrel to maintain the constant torque, wherein the constant torque is within an upper torque limit and a lower torque limit.

15. The system of claim 1, further comprising the material being introduced in a solid state into the injection unit during the material fill stage.

16. The system of claim 1, further comprising the material being injected into the mold cavity in a molten state during execution of the pack stage.

17. An apparatus for controlling an injection unit that is arranged to transfer a material to a mold cavity, wherein the injection unit includes a barrel, a ram, a material intake portion that is disposed on a first end of the barrel, and a nozzle that is disposed on a second end of the barrel, wherein the ram is rotatably and slidably disposed in a cavity defined by the barrel, and wherein the nozzle is in fluidic communication with the mold cavity, the apparatus comprising:
an actuation unit including a first actuator, a second actuator, a torque transducer, and a load cell; and
a controller;
wherein the first actuator is configured to rotate the ram within the barrel;
wherein the second actuator is configured to exert a linear force on the ram to extend and retract the ram relative to the barrel;
wherein the load cell is arranged to monitor the linear force exerted on the ram by the second actuator;
wherein the torque transducer is arranged to monitor a torque that is being exerted by the first actuator to rotate the ram;
wherein the controller is operatively connected to the first actuator and the second actuator;
wherein the controller is in communication with the torque transducer and the load cell
wherein the controller includes an instruction set that is executable to control the injection unit during an injection cycle that includes an advance shot stage, a pack stage, a hold stage, and a material fill stage;
wherein the instruction set is executable to:
deactivate the first actuator such that the ram is not rotated within the barrel during the advance shot stage, the pack stage, and the hold stage;
control the injection unit to inject material into the mold cavity during execution of the pack stage; and
control the first actuator to rotate the ram within the barrel to maintain a constant torque based upon feedback from the torque transducer and simultaneously control the second actuator to exert a compression force on the ram towards the nozzle and to retract the ram during the material fill stage.

18. The apparatus of claim 17, wherein the controller controls the second actuator to exert the compression force on the ram towards the nozzle of the injection unit, and wherein the compression force exerted by the second actuator on the ram towards the nozzle of the injection unit is controlled to a constant desired compression force.

19. The apparatus of claim 18, wherein the constant desired compression force is determined based upon a material property of the material.

20. The apparatus of claim 5, wherein the controller controls the first actuator to rotate the ram within the barrel to maintain the constant torque, wherein the constant torque is within an upper torque limit and a lower torque limit.

* * * * *